United States Patent
An (10) Patent No.: US 9,698,693 B2
(45) Date of Patent: Jul. 4, 2017

(54) CONTROL CIRCUIT, CONTROL METHOD AND SWITCH-TYPE CONVERTER

(71) Applicant: Silergy Semiconductor Technology (Hangzhou) LTD, Hangzhou, ZheJiang Province (CN)

(72) Inventor: Hongfeng An, Zhejiang Province (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 14/930,406

(22) Filed: Nov. 2, 2015

(65) Prior Publication Data

US 2016/0149493 A1 May 26, 2016

(30) Foreign Application Priority Data

Nov. 21, 2014 (CN) .......................... 2014 1 0673341

(51) Int. Cl.
*H02M 3/158* (2006.01)
*H02M 3/157* (2006.01)
*H02M 1/00* (2006.01)

(52) U.S. Cl.
CPC .......... *H02M 3/1588* (2013.01); *H02M 3/157* (2013.01); *H02M 3/158* (2013.01); *H02M 2001/0009* (2013.01)

(58) Field of Classification Search
CPC ......... H02M 2001/0009; H02M 3/156; H02M 3/158; H02M 3/1588; H02M 3/157
See application file for complete search history.

(56) References Cited

U.S. PATENT DOCUMENTS

| | | | | |
|---|---|---|---|---|
| 7,868,595 | B1* | 1/2011 | Smith | H02M 1/36 323/222 |
| RE42,142 | E * | 2/2011 | Solie | H02J 7/022 320/145 |
| 8,582,323 | B2 | 11/2013 | Berghegger | |
| 8,913,404 | B2 | 12/2014 | Xu | |
| 2004/0169979 | A1* | 9/2004 | Pai | H02M 3/1588 361/93.1 |
| 2007/0247774 | A1* | 10/2007 | Cheng | H02H 1/04 361/93.1 |
| 2008/0211471 | A1* | 9/2008 | Liao | H02M 3/156 323/282 |
| 2009/0200995 | A1* | 8/2009 | Tran | H02M 3/1582 323/222 |
| 2014/0139196 | A1 | 5/2014 | Chen | |
| 2014/0176107 | A1 | 6/2014 | Yu et al. | |

(Continued)

*Primary Examiner* — Fred E Finch, III (74) *Attorney, Agent, or Firm* — Michael C. Stephens, Jr.

(57) ABSTRACT

A control circuit configured to control a power stage circuit of a switch-type converter can include: a current detection circuit configured to detect whether an inductor current rises to a first threshold value during an on time of a first switch, and to detect whether the inductor current is greater than a second threshold value when an on time of a second switch is greater than or equal to a current detection blanking time, where the power stage circuit includes the first and second switches and the inductor; and a logic circuit configured to deactivate a first switch control signal and to activate a second switch control signal when the inductor current rises to the first threshold value such that the first switch remains off and the second switch remains on during a regulation time.

10 Claims, 4 Drawing Sheets

(56) References Cited

U.S. PATENT DOCUMENTS

2014/0247031 A1\* 9/2014 Qin ................. H02M 1/32
323/285
2015/0311795 A1\* 10/2015 Yang ................. H02M 3/156
323/271

\* cited by examiner

CONTROL CIRCUIT, CONTROL METHOD AND SWITCH-TYPE CONVERTER

RELATED APPLICATIONS

This application claims the benefit of Chinese Patent Application No. 201410673341.5, filed on Nov. 21, 2014, which is incorporated herein by reference in its entirety.

FIELD OF THE INVENTION

The present disclosure relates to the field of power electronics, and more particularly to control circuits and methods, and an associated switch-type converter.

BACKGROUND

A switching power supply may typically include a power stage circuit and a control circuit. The control circuit can be used to regulate on and off times of a power switch in a switch-type converter based on variations of an input voltage, various internal parameters, and a load, so as to maintain an output voltage or an output current of the switching power supply as substantially constant. Therefore, control approaches are very important to the design of a switching power supply, and may affect the performance thereof. Different power supply results may be achieved with different detection signals and/or different control circuits.

SUMMARY

In one embodiment, a control circuit configured to control a power stage circuit of a switch-type converter can include: (i) a current detection circuit configured to detect whether an inductor current rises to a first threshold value during an on time of a first switch, and to detect whether the inductor current is greater than a second threshold value when an on time of a second switch is greater than or equal to a current detection blanking time, where the power stage circuit includes the first and second switches and the inductor; (ii) a logic circuit configured to deactivate a first switch control signal and to activate a second switch control signal when the inductor current rises to the first threshold value such that the first switch remains off and the second switch remains on during a regulation time; and (iii) the logic circuit being configured to generate the first and second switch control signals according to a PWM signal and a zero-crossing detection signal outside of the regulation time, where the regulation time is a larger of a first time and a second time, where the first time comprises a predetermined time, and the second time comprises a time duration that the inductor current decreases from the first threshold value to the second threshold value.

In one embodiment, a method of controlling a power stage circuit of a switch-type converter, can include: (i) detecting whether an inductor current rises to a first threshold value during an on time of a first switch, and detecting whether the inductor current is less than a second threshold value when an on time of a second switch is greater than a current detection blanking time, where the power stage circuit includes the first and second switches and the inductor; (ii) controlling the first switch to remain off and the second switch to remain on during a regulation time when the inductor current rises to the first threshold value, where the regulation time is a larger of a first time and a second time, where the first time comprises a predetermined time, and the second time comprises a time duration that the inductor current decreases from the first threshold value to the second threshold value; and (iii) controlling the first and second switches according to a PWM signal and a zero-crossing signal outside the regulation circuit.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Generally, a pulse-width modulation (PWM) signal in a synchronous switch-type converter can be utilised to turn on/off a main power switch thereof. For example, when the PWM signal is active, a first switch (e.g., a main power switch) can be turned on. Also, while the PWM signal is inactive, the first switch can be turned off, and a second switch (e.g., a synchronous rectifying switch) can be turned on until an inductor current is sensed to be reduced to a predetermined valley value, at which time the second switch may be turned off. However, various parasitics in a switch node may result in oscillation during the inductor current detection process, so a current detection blanking time may be set before detecting the inductor current. Therefore, the minimum on time of the second switch may be limited when a current detection blanking time is set during the detection.

For example, when the switching frequency of the first switch is relatively high, and if the duty cycle of a PWM signal for controlling a main power switch is relatively large, the on time of the second switch might be relatively small, or even be less than the current detection blanking time. Thus, it may be difficult to detect the inductor current because the valley value may only be detected during the on time of the second switch, possibly resulting in inaccurate control of the switch-type converter.

In one embodiment, a control circuit configured to control a power stage circuit of a switch-type converter can include:

(i) a current detection circuit configured to detect whether an inductor current rises to a first threshold value during an on time of a first switch, and to detect whether the inductor current is greater than a second threshold value when an on time of a second switch is greater than or equal to a current detection blanking time, where the power stage circuit includes the first and second switches and the inductor; (ii) a logic circuit configured to deactivate a first switch control signal and to activate a second switch control signal when the inductor current rises to the first threshold value such that the first switch remains off and the second switch remains on during a regulation time; and (iii) the logic circuit being configured to generate the first and second switch control signals according to a PWM signal and a zero-crossing detection signal outside of the regulation time, where the regulation time is a larger of a first time and a second time, where the first time comprises a predetermined time, and the second time comprises a time duration that the inductor current decreases from the first threshold value to the second threshold value.

Figure 1:
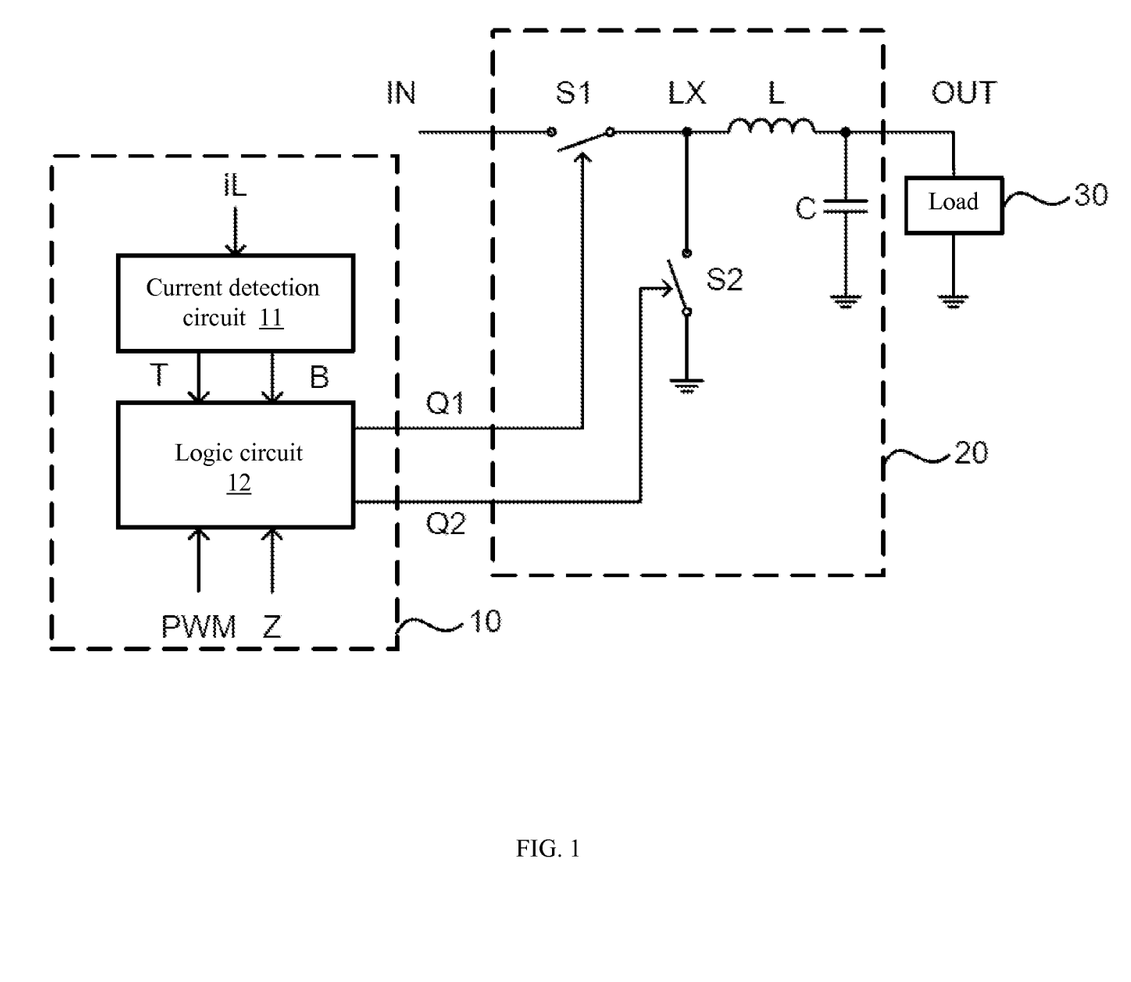
FIG. 1 is a schematic block diagram of an example switch-type converter, in accordance with embodiments of the present invention.

Referring now to FIG. 1, shown is a schematic block diagram of an example switch-type converter, in accordance with embodiments of the present invention. In this example, a switch-type converter can include control circuit 10 and power stage circuit 20. Power stage circuit 20 can include switches S1 and S2, inductor L, and output capacitor C. Switch S1 can connect between input terminal IN and an intermediate terminal LX, switch S2 can connect between intermediate terminal LX and ground, inductor L can connect between intermediate terminal LX and output terminal OUT, and output capacitor C can connect between output terminal OUT and ground.

A load 30 (e.g., a light-emitting diode [LED], etc.) can connect to output terminal OUT. Power stage circuit 20 can provide a stable DC voltage to load 30 via output terminal OUT by way of control via control circuit 10. For example, both of switches S1 and S2 can be implemented by metal oxide semiconductor transistors, or controllable switches of any other type. In this particular example, power stage circuit 20 can be in a form of a buck topology. Those skilled in the art will recognize that topologies of other types, such as a boost topology, a buck-boost topology, etc., may also be used in certain embodiments.

Control circuit 10 can be used to generate switch control signals Q1 and Q2 for controlling (turning on/off) switches S1 and S2 of the power stage circuit, in order to generate a stable voltage. In a case where the inductor current is not reduced to zero, control circuit 10 can control switch control signals Q1 and Q2 to be high and low in turn, so as to alternately turn on and off switches S1 and S2. Control circuit 10 can include current detection circuit 11 and logic circuit 12. For example, current detection circuit 11 can detect whether inductor current iL rises to a level of threshold value i2 during the on time of switch S1, and whether inductor current iL is greater than threshold value i2 when the on time of switch S2 is greater than a current detection blanking time. For example, threshold value i1 can be set to be greater than the maximum output current of the switch-type converter (e.g., from about 1.3 to about 1.5 times the maximum output current). Also, threshold value i2 can be set to be between the maximum output current and a current valley value for valley control.

In this particular example, voltage VLX at intermediate node LX can be used as the detection value of the inductor current. By comparing the detection value against threshold value i1 or threshold value i2, the inductor current may be determined to have reached threshold value i1, or to be greater than threshold value i2. As described above, if the on time of switch S2 is less than the current detection blanking time, the current detection circuit may not detect the inductor current, and current detection circuit 11 may output an inactive detection signal.

Logic circuit 12 can be used to generate switch control signals Q1 and Q2 when inductor current iL rises to threshold value i1 such that switch S1 may remain off during a regulation time (e.g., duration) "ta" while switch S2 remains on. For example, regulation time ta can be a larger one of time t1 and time t2, where time t1 is a predetermined time, and time t2 is a time during which inductor current iL is reduced from threshold value i1 to threshold value i2. The start point of time t2 may be determined by detecting if inductor current iL rises to a level of threshold value i1 by the current detection circuit. If inductor current iL is not reduced to be less than threshold value i2 after a predetermined time, the end point of time t2 may be determined by detecting inductor current i2. Logic circuit 12 may also be used to generate switch control signals Q1 and Q2 according to the PWM signal and zero-crossing detection signal Z, except for the regulating time.

Regulation time ta can begin when inductor current iL rises to a level of threshold value i1, and may end after the predetermined time, or when inductor current iL decreases to be less than threshold value i2. Outside of regulation time "ta," if inductor current iL is less than threshold value i1, logic circuit 12 may generate switch control signals Q1 and Q2 according to the PWM signal and zero-crossing detection signal Z. Regulation time ta can be set to be the larger one of time t1 and time t2 such that regulation time ta is greater than the current detection blanking time. Thus, control circuit can detect inductor current iL as well as keep the inductor current lower than threshold value i2, in addition to achieving a controllable inductor current. When the inductor current is detected to reach threshold value i1, during the regulation time, switch S1 may be turned off, and switch S2 may be turned on. The inductor current may continuously decrease, and control circuit 10 may thus effectively detect the valley value of the inductor current.

Figure 2:
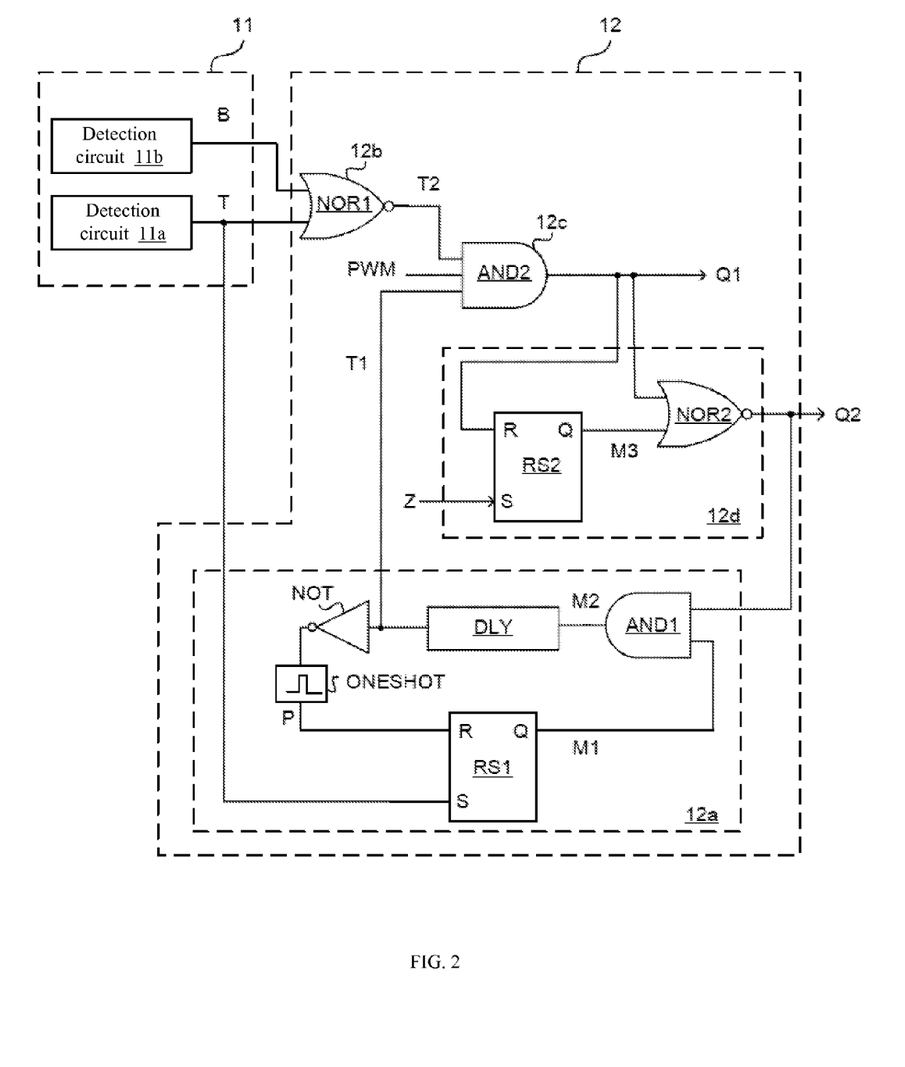
FIG. 2 is a schematic block diagram of an example controller, in accordance with embodiments of the present invention.

Referring now to FIG. 2, shown is a schematic block diagram of an example controller, in accordance with embodiments of the present invention. In this particular example, the control circuit can include current detection circuit 11 and logic circuit 12. For example, current detection circuit 11 can include detection circuits 11a and 11b. Detection circuit 11a can be used to activate detection signal T when inductor current iL is detected to reach and/or exceed a level of threshold value i1 during the on time of switch S1, and to deactivate detection signal T when inductor current iL is detected to be less than threshold value i1 during the on time of switch S1. As described above, detection signal T can be obtained by comparing voltage VLX at intermediate node LX against threshold value i1 during the on time of switch S1.

Detection circuit 11b can be used to activate detection signal B when the on time of switch S2 is greater than the current detection time and inductor current iL is greater than (or equal to) threshold value i2. Detection circuit 11b can output an inactive detection signal B when inductor current iL is not detected by detection circuit 11b (e.g., the off time of switch S1 is less than the current detection blanking time), or inductor current iL is detected to be less than threshold value i2 during the off time of switch S1. It is to be understood that the active and inactive states are two relative terms for describing the state of an electric signal, and the active state can be a logic high level or a logic low level in different applications.

Logic circuit 12 can include logic circuits 12a, 12b, 12c, and 12d. For example, logic circuit 12a can be used to output time signal T1 which remains in an inactive state for a first time when detection signal T goes active. In this example, if a high level is taken as an active state, logic circuit 12a can include RS flip-flop RS1, AND-gate AND1, flip-flop delay circuit DLY, inverter NOT, and single pulse generation circuit ONESHOT. For example, RS flip-flop RS1 may have a set terminal to receive detection signal T, a reset terminal to receive reset pulse signal P, and an output terminal for generating signal M1. Signal M1 can be used to indicate the state of detection signal T.

AND-gate AND1 can be used to receive signal M1 and switch control signal Q2, and to output signal M2. Signal M2 can be high when signal M1 is set and switch control signal Q2 is activated. Flip-flop delay circuit DLY can receive signal M2, and may generate time signal T1 that can remain in an inactive state (e.g., low level) during predetermined time t1 at the rising edge of signal M2. For example, reset pulse signal P can be used to reset RS flip-flop RS1 after time signal T1 recovers to be active, and before switch S2 is turned on again. Also, reset pulse signal P can be used to reset RS flip-flop RS1 when time signal T1 recovers to an active state. Inverter NOT can receive time signal T1, and may output an opposite/inverted signal thereof. Single pulse generation circuit ONESHOT can be used to trigger reset pulse signal P at the falling edge of the inverted version of time signal T1.

Logic circuit 12b can be used to output an inactive time signal T2 when detection signal T or detection signal B is active. If both detection signal T and detection signal B are inactive, time signal T2 may be active. Time signal T2 can remain in an inactive state from the moment that inductor current iL is detected to reach threshold value i1, until when inductor current iL is less than threshold value i2. Therefore, time signal T2 can be used to indicate a second time, such as the time during which inductor current iL decreases from threshold value i1 to threshold value i2. Logic circuit 12b may be implemented as NOR-gate NOR1 in a case where a logic high level represents the active state.

Logic circuit 12c can be used to receive time signal T1, time signal T2, and the PWM signal, and may generate switch control signal Q1, which is consistent with (e.g., the same as) the PWM signal when time signals T1 and T2 are active, otherwise switch control signal Q1 may be inactive. Logic circuit 12b can be implemented as AND-gate AND2 in a case when a high level represents the active state.

Logic circuit 12d can be used to output switch control signal Q2 according to switch control signal Q1 and zero-crossing detection signal Z. When switch control signal Q1 switches from low to high, or when zero-crossing detection signal Z goes inactive state, switch control signal Q2 switches may transition to low from high, and vice versa. For example, logic circuit 12d can include RS flip-flop RS2 and NOR-gate NOR2, such as when a high level indicates on and a low level indicates off of corresponding switch S2. RS flip-flop RS2 may have a set terminal to receive the zero-crossing detection signal Z, a reset terminal to receive switch control signal Q1, and an output terminal to generate signal M3. NOR-gate NOR2 can be used to receive signal M3 and switch control signal Q1, and to generate switch control signal Q2. In this way, flip-flop RS2 can be reset, and signal M3 may go low when switch control signal Q1 transitions from low to high. NOR-gate NOR2 may go low to indicate an off state of corresponding switch S2. Also, signal M3 can remain low level when switch control signal Q2 transitions from high to low.

If inductor current iL is reduced to zero when switch control signal Q2 is high, zero-crossing detection signal Z may go high such that RS flip-flop RS2 is set. In this case, signal M3 input to NOR-gate NOR2 may be high, while switch control signal Q1 is low such that the output of NOR-gate NOR2 is low and corresponding switch S2 is off. Switches S1 and S2 may both be turned off before the PWM signal again goes high.

Figure 3:
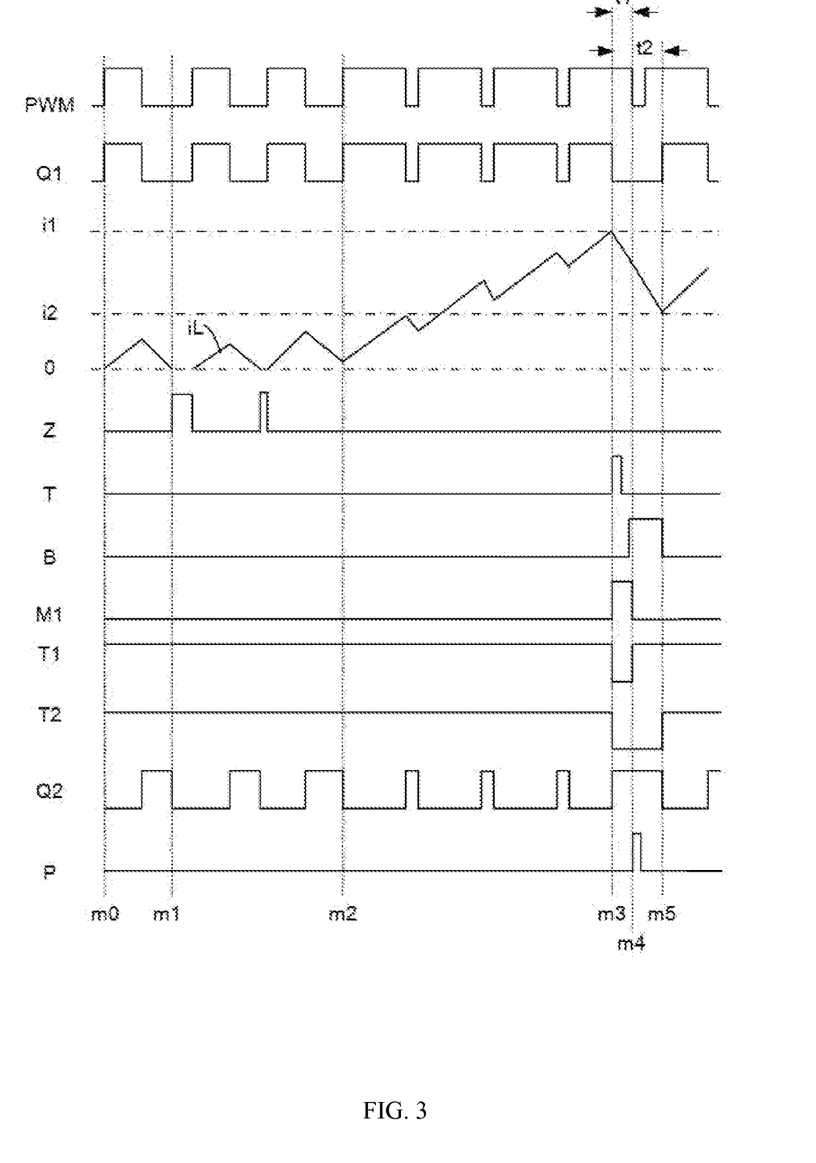
FIG. 3 is a waveform diagram showing example operation of a switch-type converter, in accordance with embodiments of the present invention.

Referring now to FIG. 3, shown is a waveform diagram of an example operation of a switch-type converter, in accordance with embodiments of the present invention. In this particular example, at time m0, the circuit is initiated, switch S1 is turned on, and switch S2 is turned off according to the PWM signal, and inductor current iL can begin rising from zero. When switch S1 is turned off and switch S2 is turned on during the first switching period, inductor current iL decreases. At time m1, inductor current iL may be detected to be zero, so zero-crossing signal Z may go high in order to turn off switch S2, and switch S1 may remain until the switching period is finished.

From time m2, the duty cycle of the PWM signal can begin to increase as the load changes (e.g., in one switching period, the on time of switch S1 may increase while the on time of switch S2 may decrease such that inductor current iL may continuously rise). If the switching period is relatively small (e.g., the switching frequency is relatively high) and the duty cycle can be increased such that the on time of switch S2 may be less than the predetermined current detection blanking time. As a result, control circuit 10 may not be able to detect inductor current iL during the off time of switch S1, which can possibly cause a loss of circuit control.

In the time duration from m0 to m3, switch control signal Q1 may be consistent with (e.g., the same logic state as) the PWM signal. When the on time of switch S1 is sufficiently long, inductor current iL may successfully be detected. Thus, in every switching period, when switch S1 is turned on, if inductor current iL may be detected to rise to a level of threshold value i1 (e.g., at time m3), and detection signal T may transition from low to high (e.g., transition from inactive to active). Detection signal T may then set RS flip-flop RS1, and signal M1 may transition from low to high.

When detection signal T is high, time signal T2 output by logic circuit 12b may go low. Thus, switch control signal Q1 may no longer be consistent with (e.g., the same logic state as) the PWM signal, and switch S1 can be turned off with timing signal T2 being low. Correspondingly, switch control signal Q2 may transition from low to high, and switch S2 can accordingly be turned on. Thus, inductor current iL may begin to decrease. After a relatively short time, inductor current iL may decrease to be less than a threshold value i1 such that detection signal T may transition from high to low (e.g., as a pulse signal). In this case, switch control signal Q2 and signal M1 may both be high such that signal M2 can transition from low to high. The rising edge of signal M2 may trigger time signal T1, which can remain in an inactive state (e.g., low level) for a predetermined time.

Time signal T1 can remain low for predetermined time t1 from time m3 to time m4. At time m4, time signal T1 may transition from low to high. For example, predetermined time t1 can be greater than the current detection blanking time, such as greater than the sum of the current detection blanking time and an inherent delay time of a comparator in the associated current detection circuit. Therefore, switch S1 may remain off at least for time t1 each time that inductor current iL rises to a level of threshold value i1. In this way, the inductor current can be detected by control circuit 10 in order to control the power stage circuit.

Prior to time m4, time signal T1 can remain low such that switch control signal Q1 can also remain low and inductor current iL may continuously decrease. At time m4, at the end of predetermined time t1, time signal T1 may transition from low to high. Also at this time, the falling edge of the inverted version of time signal T1 (e.g., at the rising edge of time signal T1) can trigger reset pulse signal P. Reset pulse signal P may reset RS flip-flop RS1 such that signal M1 transitions from high to low.

Prior to time m4, as the off time of switch S1 may already be greater than the current detection blanking time, current detection circuit 11 may detect inductor current iL. If inductor current iL is still greater than threshold value i2 at time m4, detection signal B can remain high such that time signal T2 may remain low, switch control signal Q1 can remain low, and switch control signal Q2 may remain high. Switch S1 can remain off, and switch S2 can remain on, and inductor current iL may continuously decrease. When inductor current iL decreases to a level of threshold value i2 at time m5, detection signal B may go low. Also, detection signal B may go low at time m5, and time signal T2 may go high. Switch control signal Q1 can go high, and switch control signal Q2 may go low. Thus, switch S1 may again turn on, switch S2 may again turn off, and inductor current iL can begin to rise.

If inductor current iL is already less than threshold value i2 prior to time m4 (not shown in FIG. 3), detection signal B may go low prior to time m4. Then, detection signal T can go at time m3, and time signal T2 may go high such that switch control signal Q1 goes high and switch control signal Q2 goes low. As a result, switch S1 can again turn on, switch S2 may again turn off, and inductor current iL can begin to rise. Thus, switch S1 may turn off and switch S2 may turn on instantly when inductor current iL rises to a level of threshold value i1, and this state may last at least for the predetermined time. After the predetermined time has elapsed, if inductor current iL decreases to be lower than threshold value i2, switch S1 may be turned on and switch S2 may be turned off by control of the PWM signal and zero-crossing detection signal Z. However, if inductor current iL is still greater than threshold value i2, switch S1 may remain off and switch S2 may remain on until inductor current iL decreases to threshold value i2.

The time during which inductor current iL decreases from the threshold value i1 to threshold value i2 may be defined as "the second time," which may vary along with certain circuit parameters. Thus, when inductor current iL is detected to have increased to a level of threshold value i1, switch S1 may remain off and switch S2 may remain on for a "regulation time," where the regulation time is a larger one of time t1 and time t2. In this way, the control circuit can effectively detect a valley value of the inductor current in order to realize control. Thus, the switch-type converter may operate normally in order to achieve a controllable inductor current when switching frequency is relatively high and the duty cycle is relatively large.

Those skilled in the art will recognize that the exemplary circuits herein can be alternatively implemented, e.g., such as where a NAND-gate and an OR-gate can be coupled in series to replace the AND-gate as shown, as well as other logic circuit modifications. Also, driving circuitry can be included in order to regulate switch control signals Q1 and Q2 so as to meet various control signal requirements of corresponding switches S1 and S2.

In one embodiment, a method of controlling a power stage circuit of a switch-type converter, can include: (i) detecting whether an inductor current rises to a first threshold value during an on time of a first switch, and detecting whether the inductor current is less than a second threshold value when an on time of a second switch is greater than a current detection blanking time, where the power stage circuit includes the first and second switches and the inductor; (ii) controlling the first switch to remain off and the second switch to remain on during a regulation time when the inductor current rises to the first threshold value, where the regulation time is a larger of a first time and a second time, where the first time comprises a predetermined time, and the second time comprises a time duration that the inductor current decreases from the first threshold value to the second threshold value; and (iii) controlling the first and second switches according to a PWM signal and a zero-crossing signal outside the regulation circuit.

Figure 4:
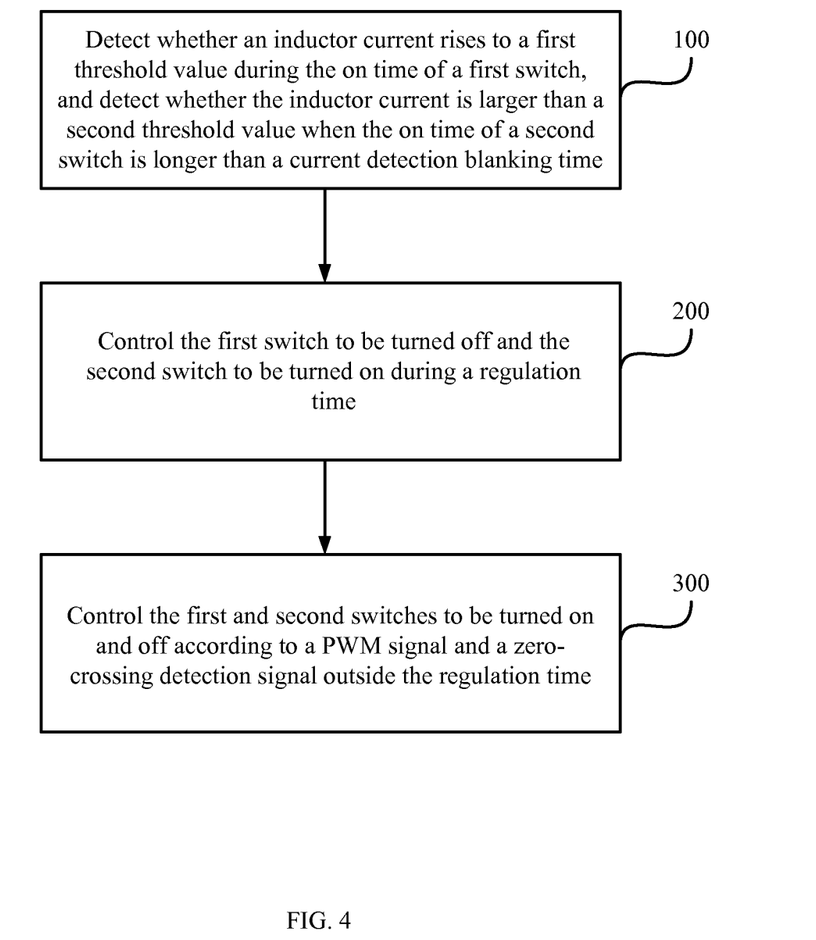
FIG. 4 is a flow diagram of an example method of controlling a switch-type converter, in accordance with embodiments of the present invention.

Referring now to FIG. 4, shown is a flow diagram of an example method of controlling a switch-type converter, in accordance with embodiments of the present invention. In this particular example, the power stage circuit can include switches S1 and S2, as well as inductor L (see, e.g., FIG. 1). At 100, it can be detected (e.g., via current detection circuit 11) whether the inductor current rises to a first threshold value (e.g., i1) during the on time of the first switch (e.g., S1). Also, it can be detected whether the inductor current is greater than a second threshold value (e.g., i2) when a second switch (e.g., S2) on time is greater than a current detection blanking time.

At 200, the first switch can be turned off and the second switch can be turned on during the regulation time when the inductor current reaches a level of the first threshold value. For example, the regulation time can be the larger one of a first time (e.g., a predetermined time) and a second time (e.g., a time during which the inductor current decreases from the first threshold value to the second threshold value). At 300, the first and second switches can be controlled to be turned on/off according to the PWM signal and the zero-crossing detection signal (e.g., Z) outside of the regulation time. For example, the regulation time can be greater than the current detection blanking time.

When the inductor current is detected to reach a level of the first threshold value, during the regulation time, the first switch may be turned off and the second switch may be turned on such that the inductor current may continuously decrease and the control circuit can effectively detect the valley value of the inductor current. In this way, a switch-type converter may operate normally to achieve a controllable inductor current when the switching frequency is relatively high and the duty cycle is relatively large.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit configured to control a power stage circuit of a switch-type converter, the control circuit comprising:
   a) a current detection circuit configured to detect whether an inductor current rises to a first threshold value during an on time of a first switch, and to detect whether said inductor current is greater than a second threshold value when an on time of a second switch is greater than or equal to a current detection blanking time, wherein said power stage circuit comprises said first and second switches and said inductor;

b) a logic circuit configured to deactivate a first switch control signal and to activate a second switch control signal when said inductor current rises to said first threshold value such that said first switch remains off and said second switch remains on during a regulation time; and c) said logic circuit being configured to generate said first and second switch control signals according to a pulse-width modulation (PWM) signal and a zero-crossing detection signal outside of said regulation time, wherein said regulation time is a larger of a first time and a second time, wherein said first time comprises a predetermined time, and said second time comprises a time duration that said inductor current decreases from said first threshold value to said second threshold value.

2. The control circuit of claim 1, wherein said current detection circuit comprises:

a) a first detection circuit configured to activate a first detection signal when said inductor current is detected to rise to said first threshold value during said on time of said first switch; and b) a second detection circuit configured to activate a second detection signal when said on time of said second switch is greater than or equal to said current detection blanking time and said inductor current is greater than said second threshold value.

3. The control circuit of claim 2, wherein said logic circuit comprises:

a) a first logic circuit configured to deactivate a first time signal when said first detection signal is activated, wherein said first time signal remains inactive for a duration of said first time;

b) a second logic circuit configured to deactivate a second time signal when said first detection signal or said second detection signal is activated;

c) a third logic circuit configured to receive said first time signal, said second time signal, and said PWM signal, and to generate said first switch control signal consistent with said PWM signal when said first and second time signals are active; and d) a fourth logic circuit configured to generate said second switch control signal according to said first switch control signal and said zero-crossing detection signal.

4. The control circuit of claim 3, wherein said first logic circuit comprises:

a) a first RS flip-flop having a set terminal configured to receive said first detection signal, a reset terminal configured to receive a reset pulse signal, and an output terminal for generating a first signal, wherein said reset pulse signal is configured to reset said first RS flip-flop after said first time signal is activated and prior to said second switch being turned on again;

b) an AND-gate configured to receive said first signal and said second switch control signal, and to generate a second signal; and c) a delay circuit configured to receive said second signal, and to output said first time signal at a rising edge of said second signal, wherein said first time signal remains inactive during said predetermined time.

5. The control circuit of claim 3, wherein said fourth logic circuit comprises:

a) a second RS flip-flop having a set terminal configured to receive said zero-crossing detection signal, a reset terminal configured to receive said first switch control signal, and an output terminal configured to generate a third signal; and b) a NOR-gate configured to receive said third signal and said first switch control signal, and to generate said second switch control signal.

6. The control circuit of claim 3, wherein:

a) said second logic circuit comprises a NOR-gate; and b) said third logic circuit comprises an AND-gate.

7. The control circuit of claim 1, wherein said regulation time is greater than said current detection blanking time.

8. The control circuit of claim 1, further comprising a load coupled to an output of said power stage circuit.

9. A method of controlling a power stage circuit of a switch-type converter, the method comprising:

a) detecting whether an inductor current rises to a first threshold value during an on time of a first switch, and detecting whether said inductor current is less than a second threshold value when an on time of a second switch is greater than a current detection blanking time, wherein said power stage circuit comprises said first and second switches and said inductor;

b) controlling said first switch to remain off and said second switch to remain on during a regulation time when said inductor current rises to said first threshold value, wherein said regulation time is a larger of a first time and a second time, wherein said first time comprises a predetermined time, and said second time comprises a time duration that said inductor current decreases from said first threshold value to said second threshold value; and c) controlling said first and second switches according to a pulse-width modulation (PWM) signal and a zero-crossing signal outside said regulation circuit.

10. The method of claim 9, wherein said regulation time is greater than said current detection blanking time.

* * * * *